United States Patent
Kim et al.

(10) Patent No.: US 11,106,617 B2
(45) Date of Patent: Aug. 31, 2021

(54) MEMORY MODULE AND DATA PROCESSING SYSTEM FOR REDUCING HEAT GENERATION

(71) Applicant: SK hynix Inc., Gyeonggi-do (KR)

(72) Inventors: Myoung Seo Kim, Gyeonggi-do (KR); Seung Yong Lee, Gyeonggi-do (KR); Young Pyo Joo, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

(21) Appl. No.: 16/352,224

(22) Filed: Mar. 13, 2019

(65) Prior Publication Data
US 2020/0034327 A1 Jan. 30, 2020

(30) Foreign Application Priority Data
Jul. 27, 2018 (KR) .................. 10-2018-0087523

(51) Int. Cl.
G06F 13/42 (2006.01)
G06F 13/16 (2006.01)
G06F 13/40 (2006.01)

(52) U.S. Cl.
CPC ...... *G06F 13/4234* (2013.01); *G06F 13/1668* (2013.01); *G06F 13/4027* (2013.01); *G06F 13/4095* (2013.01)

(58) Field of Classification Search
CPC combination set(s) only.
See application file for complete search history.

(56) References Cited

U.S. PATENT DOCUMENTS

| | | | |
|---|---|---|---|
| 9,298,228 B1* | 3/2016 | Abhyankar | G06F 1/185 |
| 9,589,941 B1* | 3/2017 | Chen | H01L 24/81 |
| 9,747,037 B2 | 8/2017 | Cai | |
| 2009/0035978 A1* | 2/2009 | Calhoun | H01R 12/82 |
| | | | 439/327 |
| 2009/0279243 A1* | 11/2009 | Amidi | G11C 5/04 |
| | | | 361/679.31 |
| 2014/0126136 A1* | 5/2014 | Lin | G06F 1/185 |
| | | | 361/679.31 |
| 2014/0133085 A1* | 5/2014 | Lin | G06F 1/185 |
| | | | 361/679.32 |
| 2014/0263585 A1* | 9/2014 | Sweere | H01L 21/4846 |
| | | | 228/180.22 |
| 2014/0348465 A1* | 11/2014 | Morris | G02B 6/4471 |
| | | | 385/18 |
| 2015/0041971 A1* | 2/2015 | Lee | H01L 24/17 |
| | | | 257/737 |
| 2015/0245525 A1* | 8/2015 | Ping | G06F 13/409 |
| | | | 361/679.32 |
| 2018/0130780 A1* | 5/2018 | Gonzales | H01L 25/18 |
| 2018/0196763 A1* | 7/2018 | Fahmy | G06F 13/1668 |
| 2019/0252361 A1* | 8/2019 | Nishida | H01L 23/13 |
| 2020/0006299 A1* | 1/2020 | Liu | H01L 21/4857 |

* cited by examiner

*Primary Examiner* — Raymond N Phan
(74) *Attorney, Agent, or Firm* — IP &T Group LLP

(57) ABSTRACT

A memory module may include: a plurality of stacked memory chips; a memory controller; and an interposer connected between the plurality of memory chips and the memory controller.

18 Claims, 4 Drawing Sheets

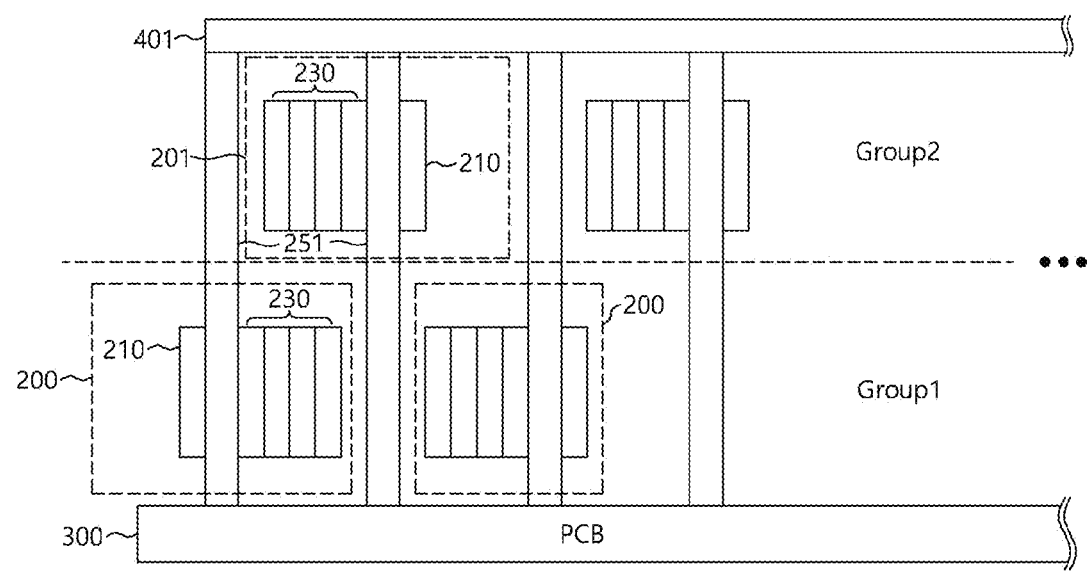

MEMORY MODULE AND DATA PROCESSING SYSTEM FOR REDUCING HEAT GENERATION

CROSS-REFERENCES TO RELATED APPLICATION

The present application claims priority under 35 U.S.C. § 119(a) to Korean application number 10-2018-0087523, filed on Jul. 27, 2018, in the Korean Intellectual Property Office, which is incorporated herein by reference in its entirety.

BACKGROUND

1. Technical Field

Various embodiments generally relate to a semiconductor circuit, and more particularly, to a memory module and a data processing system.

2. Related Art

With the improvement in performance of a data processing system such as a server system, the data processing system needs a high-performance high-integration semiconductor memory.

As shown in FIG. 1, a conventional data processing system 10 may include a plurality of memory modules 20 connected on a substrate, i.e., a printed circuit board (PCB) 30.

Each of the memory modules 20 may include a memory controller on an interposer, for example, a graphic processing unit (GPU) or central processing unit (CPU), and a plurality of chips M1 to M4 stacked over the memory controller.

The interposer may be connected to the substrate 30. The memory module 20 may perform various signal input and output (input/output) operations with the substrate 30 through the interposer.

As described above, in the conventional memory module, the memory controller and the memory chips are directly connected to each other. Therefore, since heat generated by the operation of the memory controller is directly applied to the memory chips, various concerns may arise. For example, the operation performance of the memory chips may be degraded, or the performance of the data processing system may be degraded by an operation error. Furthermore, when a cooling system for reducing heat generation is applied, power consumption is inevitably increased.

Particularly, in the operating environment of an application program such as artificial intelligence (AI), virtual reality (VR) or augmented reality (AR), a heat generation of the memory controller may become more serious. Thus, the operation performance of the memory chips may be further degraded, and the power consumption may be further increased.

SUMMARY

Various embodiments are directed to a memory module and a data processing system capable of preventing a reduction in operation performance and reducing power consumption.

In an embodiment, a memory module may include: a plurality of stacked memory chips; a memory controller; and an interposer connected between the plurality of memory chips and the memory controller.

In an embodiment, a data processing system may include: a substrate; and a plurality of sub systems connected to the substrate, wherein each of the sub systems includes a plurality of memory chips stacked vertically at the interposer in a direction parallel to the substrate.

In an embodiment, a data processing system may include: a substrate; and a plurality of sub systems connected to the substrate, wherein each of the sub systems includes: an interposer vertically connected to the substrate through the bottom thereof; a memory controller connected to one side of the interposer in a direction parallel to the substrate; and a plurality of memory chips stacked at the other side of the interposer.

In an embodiment, a data processing system may include: a substrate extended in a first direction; and a plurality of sub systems coupled to the substrate, wherein each of the plurality of sub systems includes: a plurality of memory chips having a stacked structure in the first direction; a memory controller; and an interposer coupled between the memory controller and the plurality of memory chips, and coupled to the substrate in a second direction that is substantially perpendicular to the first direction.

BRIEF DESCRIPTION OF THE DRAWINGS

FIGS. 6 and 7 illustrate data processing systems in accordance with other embodiments.

DETAILED DESCRIPTION

Hereinafter, a memory module and a data processing system according to the present disclosure will be described below with reference to the accompanying drawings through exemplary embodiments.

Figure 1:
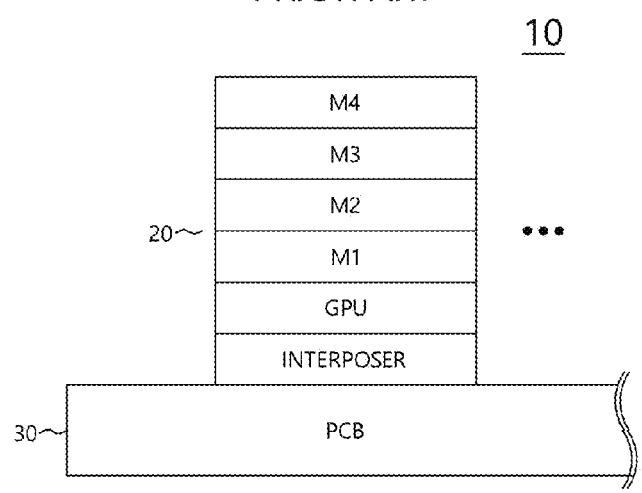
FIG. 1 illustrates a conventional data processing system.
Figure 2:
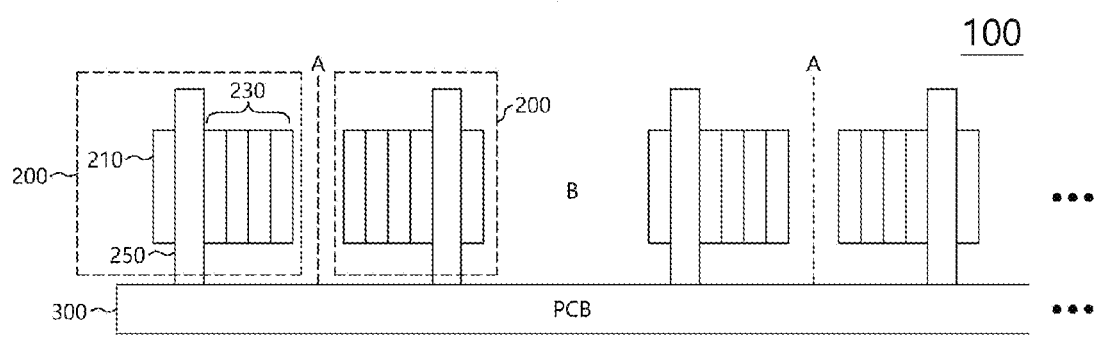
FIG. 2 illustrates a data processing system in accordance with an embodiment.

FIG. 2 illustrates a data processing system in accordance with an embodiment.

Referring to FIG. 2, the data processing system 100 may include a substrate 300, for example, a printed circuit board (PCB) and a plurality of sub systems 200.

Each of the plurality of sub systems 200 may include a plurality of memory modules. The plurality of memory modules may include a memory controller 210, a plurality of memory chips 230 and an interposer 250.

The interposer 250 may be vertically (i.e. perpendicularly from the substrate) connected to the substrate 300. The bottom portion of the interposer 250 may be in contact with the substrate 300.

The memory controller 210 may be connected to one side of the interposer 250.

The plurality of memory chips 230 may be stacked vertically at the other side of the interposer 250 in a direction parallel to the substrate 300.

The plurality of memory chips 230 and the memory controller 210 may not be directly connected to each other, but arranged at both sides of the interposer 250. Thus, this arrangement may minimize an influence of heat generated by the memory controller 210 on the plurality of memory chips 230.

The plurality of sub systems 200 may be symmetrically connected to the substrate 300, with a first distance provided therebetween.

Each pair of sub systems adjacent to each other among the plurality of sub systems 200 may be arranged symmetrically with respect to a line 'A', while facing each other.

Since the plurality of sub systems 200 have a symmetrical structure, an influence of heat generated by the memory controllers 210 of the adjacent sub systems 200 on each other may be minimized.

The plurality of sub systems 200 may be arranged with a predetermined distance provided between the respective pairs. Hereafter, the predetermined distance will be referred to as a second distance.

The second distance may have a value greater than or equal to the first distance.

Since the pairs of sub systems 200 are arranged with the second distance provided therebetween, a space for air flow may be formed as indicated by 'B'. Hereafter, the space will be referred to as an air cooling space.

The first and second distances may be varied in consideration of the integration density of the sub systems 200, a design margin, the optimal cooling performance and the like.

Figure 3:
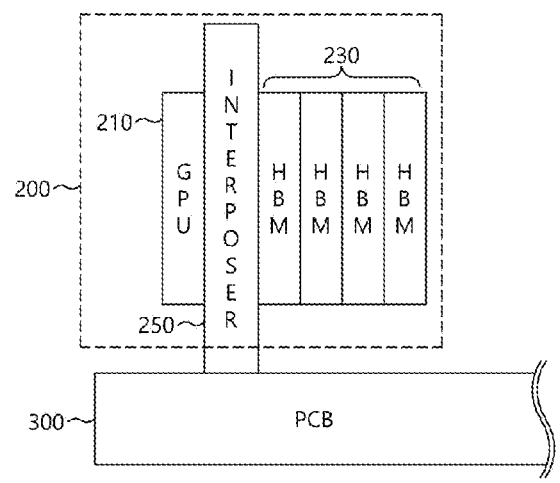
FIG. 3 illustrates a sub system in accordance with an embodiment.

FIG. 3 illustrates a sub system in accordance with an embodiment, for example, the sub system 200 of FIG. 2.

Referring to FIG. 3, the sub system 200 may include a memory controller 210, a plurality of memory chips 230 and an interposer 250. The memory controller 210 may include a graphic processing unit (GPU) or central processing unit (CPU).

Each of the memory chips 230 may include a high bandwidth memory (HBM).

The plurality of memory chips 230 may be connected through through-silicon vias (TSVs) to input/output signals to/from one another.

The interposer 250 may be vertically connected to the substrate 300.

The substrate 300 and the interposer 250 may be connected to each other through various methods.

The interposer 250 may have various types of connection structures suitable for a connection method supported by the substrate 300.

For example, the interposer 250 may be connected to the substrate 300 through wire bonding or a solder ball.

For another example, when the substrate 300 supports a socket, the interposer 250 and the substrate 300 may be connected to each other through a method of configuring an edge connector on the interposer 250 and inserting the edge connector into the socket.

For another example, when the substrate 300 supports a pin, the interposer 250 and the substrate 300 may be connected to each other through a method of configuring a connector corresponding to the pin and inserting the connector into the pin.

The connection methods between the interposer 250 and the substrate 300 that are described here are few of the examples. The interposer 250 and the substrate 300 may be connected through various other methods.

Figure 4:
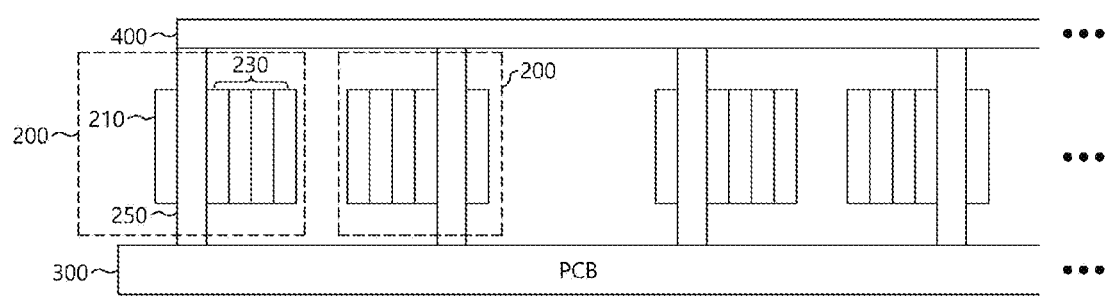
FIG. 4 illustrates a data processing system in accordance with another embodiment.

FIG. 4 illustrates a data processing system 101 in accordance with another embodiment.

Referring to FIG. 4, the data processing system 101 may include a substrate 300, a plurality of sub systems 200 and a bridge model 400.

Each of the plurality of sub systems 200 may include a plurality of memory modules. The plurality of memory modules may include a memory controller 210, a plurality of memory chips 230 and an interposer 250.

The interposer 250 may be vertically connected to the substrate 300.

The memory controller 210 may be connected to one side of the interposer 250.

The plurality of memory chips 230 may be stacked vertically at the other side of the interposer 250 in a direction parallel to the substrate 300.

The plurality of memory chips 230 and the memory controller 210 may not be directly connected to each other, but arranged at a respective side (i.e. one side connected to the memory controller 210 and the other side connected to the memory chips 230) of the interposer 250. Thus, this arrangement may minimize an influence of heat generated by the memory controller 210 on the plurality of memory chips 230.

Like the structure of FIG. 2, each pair of sub systems 200 adjacent to each other among the plurality of sub systems 200 may be symmetrically arranged with a first distance provided therebetween, while facing each other.

Since the plurality of sub systems 200 have a symmetrical structure, an influence of heat generated by the memory controllers 210 of the adjacent sub systems 200 on each other may be minimized.

The plurality of sub systems 200 may be arranged with a second distance provided between the respective pairs, like the structure of FIG. 2.

The second distance may have a value greater than or equal to the first distance.

Since the pairs of sub systems 200 are arranged with the second distance provided therebetween, an air cooling space for air flow may be formed.

The first and second distances may be varied in consideration of the integration density of the sub systems 200, a design margin, the optimal cooling performance and the like.

The bridge model 400 may be connected to the top portions of the interposers 250 of the plurality of sub systems 200 in common.

The bridge model 400 may include signal lines for signal input and output among the plurality of sub systems 200.

The bridge model 400 may allow signals to be inputted and outputted among the plurality of sub systems 200, and stably fix the plurality of sub systems 200 to the substrate 300.

The plurality of sub systems 200 connected through the bridge model 400 may constitute a pooled memory module.

Figure 5:
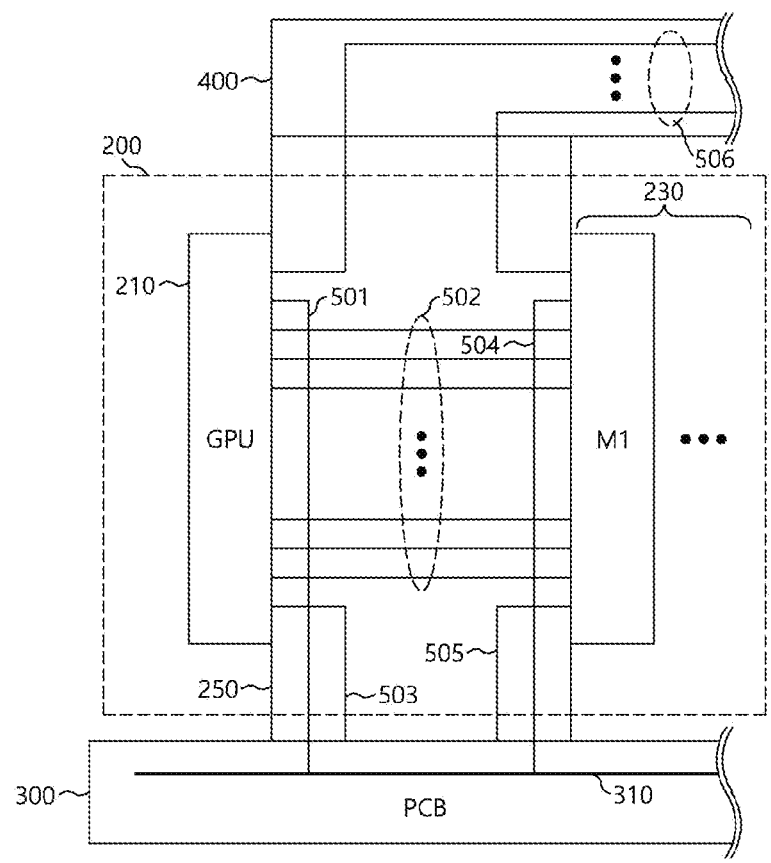
FIG. 5 illustrates signal line connections of a data processing system in accordance with the present embodiment.

FIG. 5 illustrates signal line connections of a data processing system in accordance with the present embodiment, for example, the data processing system 101 of FIG. 4.

Referring to FIG. 5, the data processing system 101 may include a substrate 300, a plurality of sub systems 200 and a bridge model 400. The substrate 300 may include a power rail 310.

The memory controller 210 may receive power through a signal line 501 coupled to the power rail 310 of the substrate 300.

The memory chips 230 including a memory chip M1 may receive power through a signal line 504 coupled to the power rail 310 of the substrate 300.

The memory controller 210 and the memory chips 230 may exchange data, addresses or/and commands with each other through signal lines 502. Further, the memory controller 210 and the memory chips 230 may input and output signals to and from the substrate 300 through signal lines 503 and 505.

The memory controller 210 and the memory chips 230 may be coupled to another sub system 200 through signal lines 506 of the bridge model 400.

Figure 6:
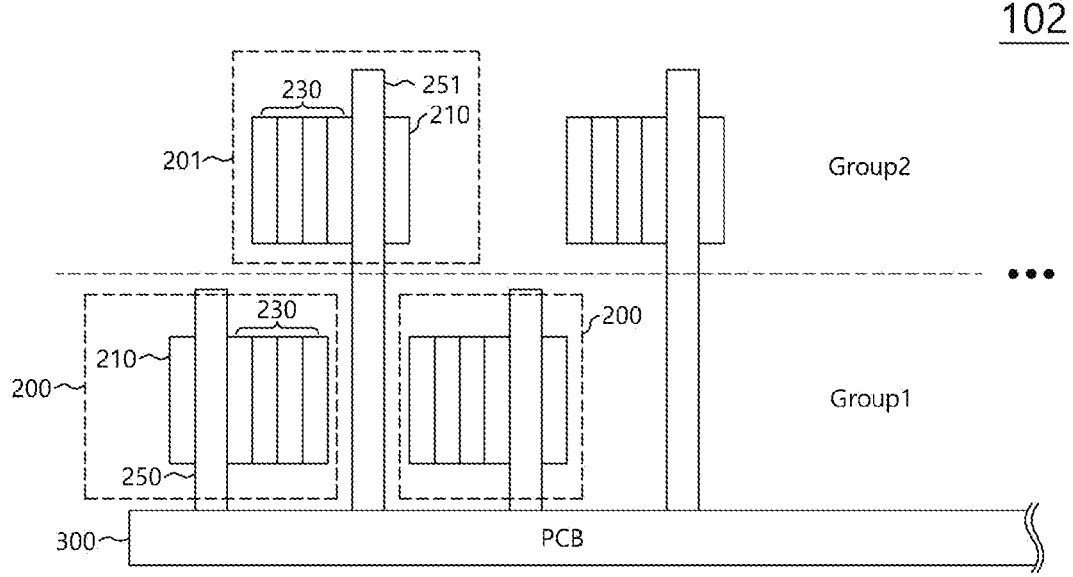

FIG. 6 illustrates a data processing system 102 in accordance with another embodiment.

Referring to FIG. 6, the data processing system 102 may include a substrate 300 and first and second sub system groups Group1 and Group2 connected to the substrate 300.

The first sub system group Group1 may include a plurality of sub systems 200 connected to the substrate 300 through interposers 250 having a first distance.

The second sub system group Group2 may include a plurality of sub systems 201 connected to the substrate 300 through interposers 251 having a second distance. The second sub system group Group2 may be arranged at a higher position than the first sub system group Group1 with respect to the substrate 300.

The interposer 250 may be configured in the same manner as the interposer 250 described with reference to FIGS. 2 and 4, and thus represented by the same reference numeral.

The interposer 251 may be configured in the same manner as the interposer 250, except that the interposer 251 has a different length from the interposer 250.

Each of the plurality of sub systems 200 of the first sub system group Group1 may include a plurality of memory modules. Each of the plurality of sub systems 200 may include a memory controller 210, a plurality of memory chips 230 and the interposer 250.

The interposer 250 may be vertically connected to the substrate 300.

The memory controller 210 may be connected to one side of the interposer 250.

The plurality of memory chips 230 may be stacked vertically at the other side of the interposer 250 in a direction parallel to the substrate 300.

The plurality of memory chips 230 and the memory controller 210 may not be directly connected to each other, but arranged at both sides of the interposer 250. Thus, this arrangement may minimize an influence of heat generated by the memory controller 210 on the plurality of memory chips 230.

Like the structure of FIG. 2, each pair of sub systems 200 adjacent to each other among the plurality of sub systems 200 may be arranged symmetrically with each other, while facing each other.

Since the plurality of sub systems 200 have a symmetrical structure, an influence of heat generated by the memory controllers 210 of the adjacent sub systems 200 on each other may be minimized.

Each of the plurality of sub systems 201 of the second sub system group Group2 may be vertically connected to the substrate 300 through the interposer 251 between the respective sub systems 200 of the first sub system group Group1.

Since the interposer 251 has a length greater than that of the interposer 250, the second sub system group Group2 may be arranged at a higher position than the first sub system group Group1 with respect to the substrate 300.

Each of the sub systems 201 may be configured in the same manner as the sub system 200 of FIG. 3, except for the interposer 251.

The data processing system 102 may selectively use one of the first and second system groups Group1 and Group2 by giving priorities to the first and second system groups Group1 and Group2. Alternatively, the data processing system 102 may use both of the first and second system groups Group1 and Group2. For example, the data processing system 102 may use both of the first and second system groups Group1 and Group2, in case of an increase in memory usage. The use setting of the first and second system groups Group1 and Group2 may be based on a preset value, or changed by the control of an external device.

For example, a higher priority may be given to the second sub system group Group2 than the first sub system group Group1. In this circumstance, the data processing system 102 may use the first sub system group Group1 when the current memory usage with respect to the entire memory capacity is less than or equal to a preset reference value.

When the current memory usage with respect to the entire memory capacity exceeds the reference value, the data processing system 102 may use both of the first and second sub system groups Group1 and Group2.

FIG. 7 illustrates a data processing system 103 in accordance with another embodiment.

Referring to FIG. 7, the data processing system 103 may include a substrate 300, first and second sub system groups Group1 and Group2 connected to the substrate 300, and a bridge model 401.

The first sub system group Group1 may include the plurality of sub systems 200 connected to the substrate 300 through the interposers 251 having the second distance, which have been described with reference to FIG. 6.

The second sub system group Group2 may include a plurality of sub systems 201 connected to the substrate 300 through interposers 251 having the second distance. The second sub system group Group2 may arranged at a higher position than the first sub system group Group1 with respect to the substrate 300.

The interposer 251 of the first sub system group Group1 of FIG. 7 may be connected to the substrate 300 in the opposite direction of FIG. 6, which indicates the top portion of the interposer 251 based on FIG. 6. Thus, the plurality of sub systems 201 of the first sub system group Group1 may have a lower position than the plurality of sub systems 201 of the second sub system group Group2.

Each of the sub systems 201 of the second sub system group Group2 may be vertically connected to the substrate 300 through the bottom portion of the interposer 251 between the respective sub systems 201 of the first sub system group Group1.

Each of the sub systems 201 may be configured in the same manner as the sub system 200 of FIG. 3, except for the interposer 251.

The bridge model 401 may be connected to the top portions of the interposers 251 of the plurality of sub systems 201 in common.

The bridge model 401 may include signal lines for signal input/output among the plurality of sub systems 201.

The bridge model 401 may allow signals to be inputted and outputted among the plurality of sub systems 201, and stably fix the plurality of sub systems 201 to the substrate 300.

The plurality of sub systems 201 connected through the bridge model 401 may constitute a pooled memory module.

The data processing system 103 may selectively use one of the first and second system groups Group1 and Group2 by giving priorities to the first and second system groups Group1 and Group2. Alternatively, the data processing system 103 may use both of the first and second system groups Group1 and Group2. For example, the data processing system 103 may use both of the first and second system groups Group1 and Group2, in case of an increase in memory usage. The use setting of the first and second system groups Group1 and Group2 may be based on a preset value, or changed by the control of an external device.

As described above, the data processing system in accordance with the present embodiments may reduce heat generated by the memory controller through the structure in which the memory controller and the memory chips are separated from each other, and perform cooling (for example, air cooling) through the symmetrical structure of the sub systems without a separate cooling system. Thus, the embodiments may solve concerns such as a degradation in operation performance of the memory chips and a power consumption increase. Therefore, the data processing systems be stably operated even in the operating environment of an application program such as artificial intelligence (AI), virtual reality (VR) or augmented reality (AR).

While various embodiments have been described above, it will be understood to those skilled in the art that the embodiments described are examples only. Accordingly, the operating method of a data storage device described herein should not be limited based on the described embodiments.

What is claimed is:

1. A data processing system comprising:
a substrate; and
a plurality of sub systems connected to the substrate, wherein each of the sub systems comprises:
an interposer vertically connected to the substrate; and
a plurality of memory chips stacked vertically at the interposer in a direction parallel to the substrate.

2. The data processing system according to claim 1, wherein each of the sub systems comprises a memory controller and the interposer connected between the memory controller and the plurality of memory chips,
wherein the plurality of sub systems are connected to the substrate through the interposer.

3. The data processing system according to claim 2, wherein each pair of sub systems adjacent to each other among the plurality of sub systems are symmetrically arranged with a first distance provided therebetween.

4. The data processing system according to claim 3, wherein the plurality of sub systems are arranged with a second distance provided between the respective pairs,
wherein the second distance has a value greater than or equal to the first distance.

5. A data processing system comprising:
a substrate; and
a plurality of sub systems connected to the substrate, wherein each of the sub systems comprises:
an interposer vertically connected to the substrate;
a memory controller connected to one side of the interposer; and
a plurality of memory chips vertically stacked at the other side of the interposer in a direction parallel to the substrate.

6. The data processing system according to claim 5, wherein each pair of sub systems adjacent to each other among the plurality of sub systems are symmetrically arranged with a first distance provided therebetween.

7. The data processing system according to claim 5, wherein some of the plurality of sub systems are connected to the substrate to have a different position from the other sub systems.

8. The data processing system according to claim 5, wherein the plurality of sub systems comprises:
a first sub system group connected to the substrate through an interposer having a first length; and
a second sub system group connected to the substrate through an interposer having a second length.

9. The data processing system according to claim 5, further comprising a bridge model connected to the top portions of the interposers of the plurality of sub systems in common.

10. The data processing system according to claim 6, wherein the plurality of sub systems are arranged with a second distance provided between the respective pairs, and wherein the second distance has a value greater than or equal to the first distance.

11. The data processing system according to claim 8, wherein one of the first and second sub system groups is used by giving priorities to the first and second sub system groups, or both of the first and second sub system groups are used.

12. The data processing system according to claim 9, wherein the bridge model comprises signal lines for signal input and output between the memory controllers of the plurality of sub systems and the plurality of memory chips.

13. A data processing system comprising:
a substrate; and
a plurality of sub systems coupled to the substrate, wherein each of the plurality of sub systems includes:
an interposer connected to the substrate;
a memory controller connected to one side of the interposer; and
a plurality of memory chips stacked at the other side of the interposer,
wherein the plurality of sub systems comprises:
a first sub system group connected to the substrate through an interposer having a first length; and
a second sub system group connected to the substrate through an interposer having a second length.

14. The data processing system according to claim 13, wherein each pair of sub systems adjacent to each other among the plurality of sub systems are symmetrically arranged with a first distance provided therebetween.

15. The data processing system according to claim 13, wherein some of the plurality of sub systems are connected to the substrate to have a different position from the other sub systems.

16. The data processing system according to claim 13, wherein one of the first and second sub system groups is used by giving priorities to the first and second sub system groups, or both of the first and second sub system groups are used.

17. The data processing system according to claim 13, further comprising a bridge model connected to the top portions of the interposers of the plurality of sub systems in common.

18. The data processing system according to claim 14, wherein the plurality of sub systems are arranged with a second distance provided between the respective pairs, and
wherein the second distance has a value greater than or equal to the first distance.

* * * * *